(12) United States Patent
Feyereisen et al.

(10) Patent No.: US 9,563,944 B2
(45) Date of Patent: Feb. 7, 2017

(54) SYSTEM AND METHOD FOR DISPLAYING OPTIMIZED OWNSHIP POSITION ON A NAVIGATION DISPLAY

(71) Applicant: HONEYWELL INTERNATIONAL INC., Morristown, NJ (US)

(72) Inventors: Thea L. Feyereisen, Hudson, WI (US); Ivan Sandy Wyatt, Scottsdale, AZ (US); Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 48 days.

(21) Appl. No.: 14/243,774

(22) Filed: Apr. 2, 2014

(65) Prior Publication Data
US 2015/0287181 A1 Oct. 8, 2015

(51) Int. Cl.
| | | |
|---|---|---|
| G06T 7/00 | (2006.01) |
| G09G 5/14 | (2006.01) |
| G06T 7/20 | (2006.01) |
| G01C 21/00 | (2006.01) |
| G01C 23/00 | (2006.01) |
| G06F 3/0485 | (2013.01) |
| G08G 5/00 | (2006.01) |

(52) U.S. Cl.
CPC ............ G06T 7/0008 (2013.01); G01C 21/00 (2013.01); G01C 23/00 (2013.01); G06F 3/0485 (2013.01); G06T 7/0048 (2013.01); G06T 7/0061 (2013.01); G06T 7/2006 (2013.01); G08G 5/0021 (2013.01); G09G 5/14 (2013.01); *G06T 2207/10016* (2013.01); *G06T 2207/10028* (2013.01); *G06T 2207/10032* (2013.01); *G06T 2207/30232* (2013.01); *G06T 2207/30241* (2013.01); *G08G 5/0052* (2013.01)

(58) Field of Classification Search
CPC .... G06T 7/0008; G06T 7/0061; G06T 7/2006; G09G 5/14
See application file for complete search history.

(56) References Cited

U.S. PATENT DOCUMENTS

| | | | | |
|---|---|---|---|---|
| 3,652,836 A | * | 3/1972 | Richardson ............... | G01S 1/02 342/409 |
| 4,792,906 A | * | 12/1988 | King et al. ....................... | 701/5 |
| 6,163,743 A | | 12/2000 | Bomans et al. | |
| 8,793,039 B1 | * | 7/2014 | Hammack et al. ............. | 701/14 |

(Continued)

FOREIGN PATENT DOCUMENTS

EP 2273236 A2 1/2011

OTHER PUBLICATIONS

EP Extended Search Report for Application No. EP 15159740.8 dated Sep. 3, 2015.

*Primary Examiner* — James A Thompson
*Assistant Examiner* — Tapas Mazumder
(74) *Attorney, Agent, or Firm* — Lorenz & Kopf, LLP

(57) ABSTRACT

A display system and method for graphically representing a host aircraft comprises a display, a first source host aircraft position data and a second source of data representative of airspace in the vicinity of the host aircraft. A processor is coupled to the display, the first source, and the second source and is configured to (1) determine a position of the host aircraft that expands the visualization of an intended trajectory of the host aircraft, and (2) display the host aircraft at the position on the display.

18 Claims, 9 Drawing Sheets

(56) References Cited

U.S. PATENT DOCUMENTS

| | | | |
|---|---|---|---|
| 2003/0193410 A1* | 10/2003 | Chen | G01C 23/005 340/971 |
| 2006/0005147 A1 | 1/2006 | Hammack et al. | |
| 2008/0021648 A1* | 1/2008 | Wilson | 701/301 |
| 2010/0250117 A1 | 9/2010 | Deker et al. | |
| 2011/0010082 A1 | 1/2011 | Wilson et al. | |

* cited by examiner

SYSTEM AND METHOD FOR DISPLAYING OPTIMIZED OWNSHIP POSITION ON A NAVIGATION DISPLAY

TECHNICAL FIELD

Embodiments of the subject matter described herein relate generally to vehicular display systems and, more particularly, to an avionics display system and method for visually expressing flight information at a preferred location on a host aircraft display such as a lateral moving map display.

BACKGROUND

Modern electronic displays for vehicles (such as aircraft, automobiles, marine vessels, or trains) display a considerable amount of information, such as vehicle position, navigation data, and terrain information. In the case of an aircraft, many modern flight deck displays (or cockpit displays) include a lateral view, generally known as a lateral moving map display, which is basically a top-down view of the flight plan that may include, for example, a top-down view of an aircraft symbol, terrain information, political boundaries, navigation aids and/or waypoint symbols, line segments that interconnect the waypoint symbols, and range rings.

Often, a pilot may pan the lateral moving map display to achieve, for example, a preferred forward planned path. For example, if the route of a planned trajectory extends west to east, the pilot may orient the map with North up and then pan the map such that the aircraft symbology is at the far left of the display since the pilot is less concerned about features to the rear of the current position of the aircraft than features and waypoints that are ahead of the current location of the aircraft within the flight plan.

In known systems, a user (e.g., a crewmember) may manually adjust the area displayed in the lateral moving map display by scrolling the map in either a lateral direction (e.g., up or down, left or right) or a cardinal direction (e.g., North or South, East or West), or by manually dragging the map to a desired area. However, in some situations, adjusting the area displayed on the lateral moving map in the proper direction can be difficult and/or not intuitive; e.g. when the lateral map is oriented in the direction of travel (e.g., heading up) or when the flight plan turns in a direction that is not evident by the current state of the lateral map display. In addition, it is difficult to adjust the lateral moving map display diagonally and/or in a non-cardinal direction. At times, the aircraft may even travel off the display without the pilot noticing, thus decreasing the pilot's situational awareness. In addition, repositioning the lateral moving map display undesirably increases the workload of the pilot.

Thus, it would be desirable to provide a system and method for determining a preferred or optimal position on a display at which the ownship or host aircraft symbology should be generated and graphically securing the aircraft (i.e. "sticking" the aircraft) to that position. It would also be desirable to provide a system and method for dynamically determining an optimal position on a display at which the ownship or host aircraft symbology should be generated based on a heading, projected flight plan, and/or changes to the flight plan.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method is provided for repositioning symbology graphically representing a host aircraft on a lateral map display. The method comprises receiving host aircraft position data and data representative of airspace in the vicinity of the host aircraft. The method further comprises altering in a processor the position of the host aircraft in accordance with the intended trajectory of the host aircraft and rendering symbology visually representative of the host aircraft at the altered position to expand display of the intended trajectory.

A display system for deployment on board an aircraft is also provided. The system comprises a display, a first source host aircraft position data, and a second source of data representative of airspace in the vicinity of the host aircraft. The system also comprises a processor coupled to the display, the first source, and the second source and configured to (1) determine a preferred position of the host aircraft that expands visualization of an intended trajectory of the host aircraft; and (2) display the host aircraft at the determined position on the display.

Furthermore, other desirable features and characteristics of the system and method will become apparent from the following detailed description and the appended claims, taken in conjunction with the accompanying drawings and the preceding background.

BRIEF DESCRIPTION OF THE DRAWINGS

Embodiments of the subject matter will hereinafter be described in conjunction with the following figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Figure 1:
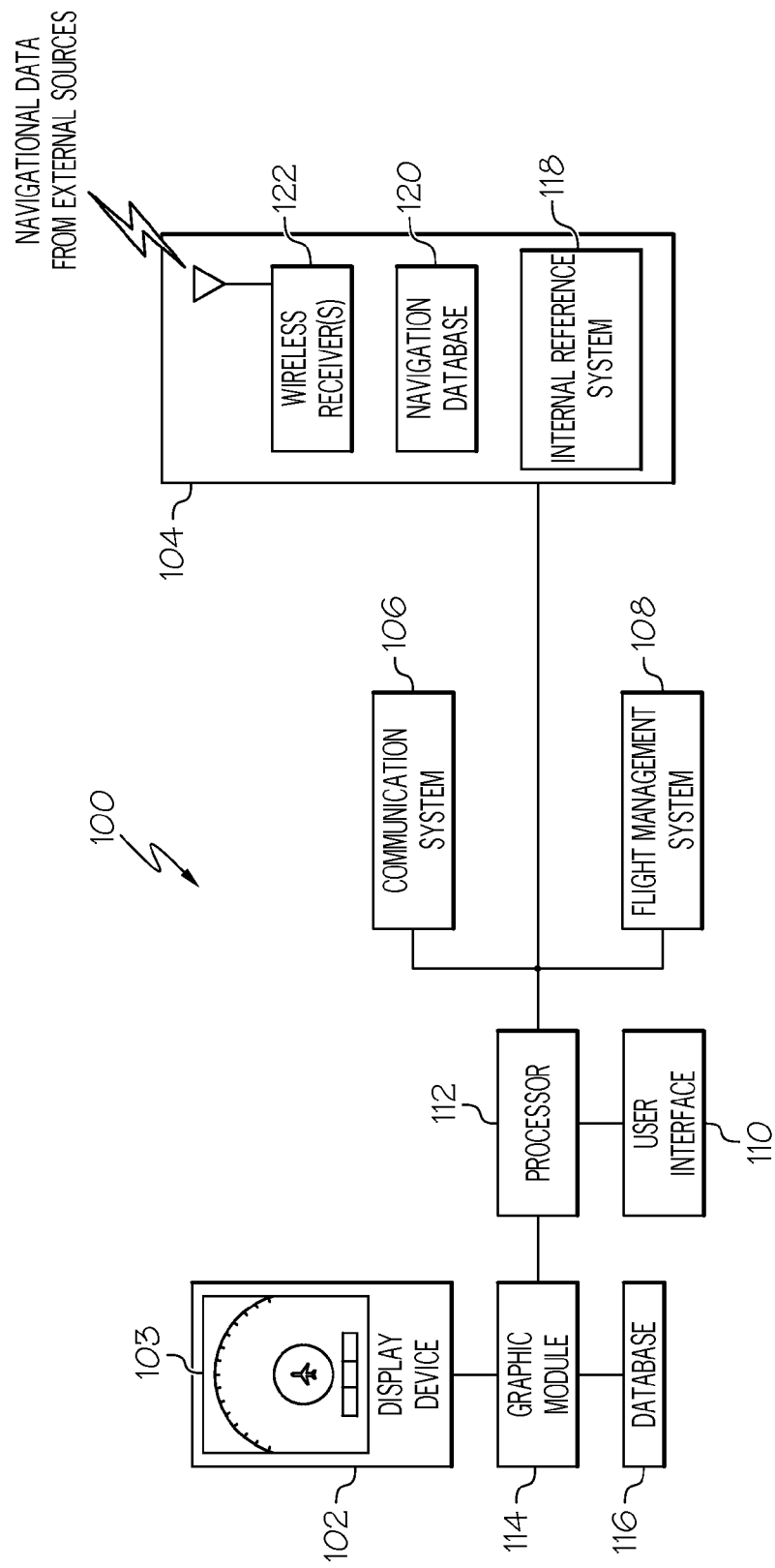
FIG. 1 is functional block diagram of a generalized avionics display system in accordance with an exemplary embodiment.

FIG. 1 depicts an exemplary embodiment of a display system 100, which may be located onboard a vehicle such as an aircraft. In an exemplary embodiment, the display system 100 includes, without limitation, a display device 102, a navigation system 104, a communications system 106, a flight management system 108 (FMS), a processor 112, and a graphics module 114. The display system 100 may further include a user interface 110 for enabling interactivity with the display system 100 and a database 116 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft will include numerous other devices and components for providing additional functions and features, as will be appreciated in the art. For example, the display system 100 and/or the aircraft may include one or more avionics systems (e.g., a weather system, an air traffic management system, a radar system, a traffic avoidance system, etc.) coupled to the flight management system 108 and/or the processor 112 for obtaining and/or providing real-time flight-related information that may be displayed on the display device 102.

In an exemplary embodiment, the display device 102 is coupled to the graphics module 114. The graphics module 114 is coupled to the processor 112, and the processor 112 and the graphics module 114 are cooperatively configured to display, render, or otherwise convey one or more graphical representations or images associated with operation of the aircraft on the display device 102, as described in greater detail below. The processor 112 is coupled to a navigation system 104 for obtaining real-time navigational data and/or information regarding operation of the aircraft to support operation of the display system 100.

The processor 112 generally represents the hardware, software, and/or firmware components configured to facilitate the display and/or rendering of a navigational map on the display device 102 and perform additional tasks and/or functions described in greater detail below. Depending on the embodiment, the processor 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor 112 may also be implemented as a combination of computing devices, e.g., a combination of a digital signal processor and a microprocessor, a plurality of microprocessors, one or more microprocessors in conjunction with a digital signal processor core, or any other such configuration. In practice, the processor 112 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processor 112, or in any practical combination thereof.

In an exemplary embodiment, communications system 106 is coupled to the processor 112 and configured to support communications to and/or from the aircraft, as will be appreciated in the art. The processor 112 is also coupled to a flight management system (FMS) 108, which in turn, may also be coupled to the navigation system 104 and the communications system 106 for providing real-time data and/or information regarding operation of the aircraft to processor 112 to support operation of the aircraft, as will be appreciated in the art. In an exemplary embodiment, a user interface 110 is coupled to the processor 112, and the user interface 110 and the processor 112 are cooperatively configured to allow a user to interact with the display device 102 and other elements of display system 100, as described in greater detail below.

In an exemplary embodiment, the display device 102 is realized as an electronic display configured to graphically display flight information or other data associated with operation of the aircraft under control of the graphics module 114. In an exemplary embodiment, the display device 102 is located within a cockpit of the aircraft. It will be appreciated that although FIG. 1 shows a single display device 102, in practice, additional display devices may be present onboard the aircraft. In an exemplary embodiment, the user interface 110 is also located within the cockpit of the aircraft and adapted to allow a user (e.g., pilot, co-pilot, or crew member) to interact with the display system 100 and enables a user to indicate, select, or otherwise manipulate content displayed on the display device 102, as described in greater detail below. In various embodiments, the user interface 110 may be realized as a keypad, touchpad, keyboard, mouse, touchscreen, joystick, knob, microphone, or another suitable device adapted to receive input from a user.

In an exemplary embodiment, the navigation system 104 includes one or more wireless receivers 122, a navigation data base 120, and an inertial reference system 118 and is configured to obtain one or more navigational parameters associated with operation of the aircraft. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. In some embodiments, the navigation system 104 may also obtain and/or determine the heading of the aircraft (i.e., the direction the aircraft is traveling in relative to some reference). In an exemplary embodiment, the communications system 106 is suitably configured to support communications between the aircraft and another aircraft or ground location (e.g., air traffic control). In this regard, the communications system 106 may be realized using a radio communication system or another suitable data link system.

In an exemplary embodiment, the flight management system 108 (or, alternatively, a flight management computer) is located onboard the aircraft. Although FIG. 1 is a simplified representation of display system 100, in practice, the flight management system 108 may be coupled to one or more additional modules or components as necessary to support navigation, flight planning, and other aircraft control functions in a conventional manner.

In an exemplary embodiment, the flight management system 108 maintains information pertaining to a current flight plan (or alternatively, a current route or travel plan). In this regard, depending on the embodiment, the current flight plan may comprise either a selected or otherwise designated flight plan for subsequent execution, a flight plan selected for review on the display device 102, and/or a flight plan currently being executed by the aircraft. In this regard, as used herein, a flight plan should be understood as a sequence of navigational reference points that define a flight path or route for the aircraft.

The graphics module 114 generally represents the hardware, software, and/or firmware components configured to control the display and/or rendering of a navigational map on the display device 102 and perform additional tasks and/or functions described in greater detail below. In an exemplary embodiment, the graphics module 114 accesses one or more databases 116 suitably configured to support operations of the graphics module 114, as described below. In this regard, the database 116 may comprise a terrain database, an obstacle database, a navigational database, a geopolitical database, a terminal airspace database, a special use airspace database, or other information for rendering and/or displaying content on the display device 102, as described below. It will be appreciated that although FIG. 1 shows a single database 116 for purposes of explanation and ease of description, in practice, numerous databases will likely be present in a practical embodiment of the display system 100.

Display system 100 may be configured to perform a display process and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the flight management system 108, the user interface 110, the processor 112, the graphics module 114 and/or the database 116. It should be appreciated that any number of additional or alternative tasks may be included, and may be incorporated into a more comprehensive procedure or process having additional functionality not described in detail herein.

Figure 2:
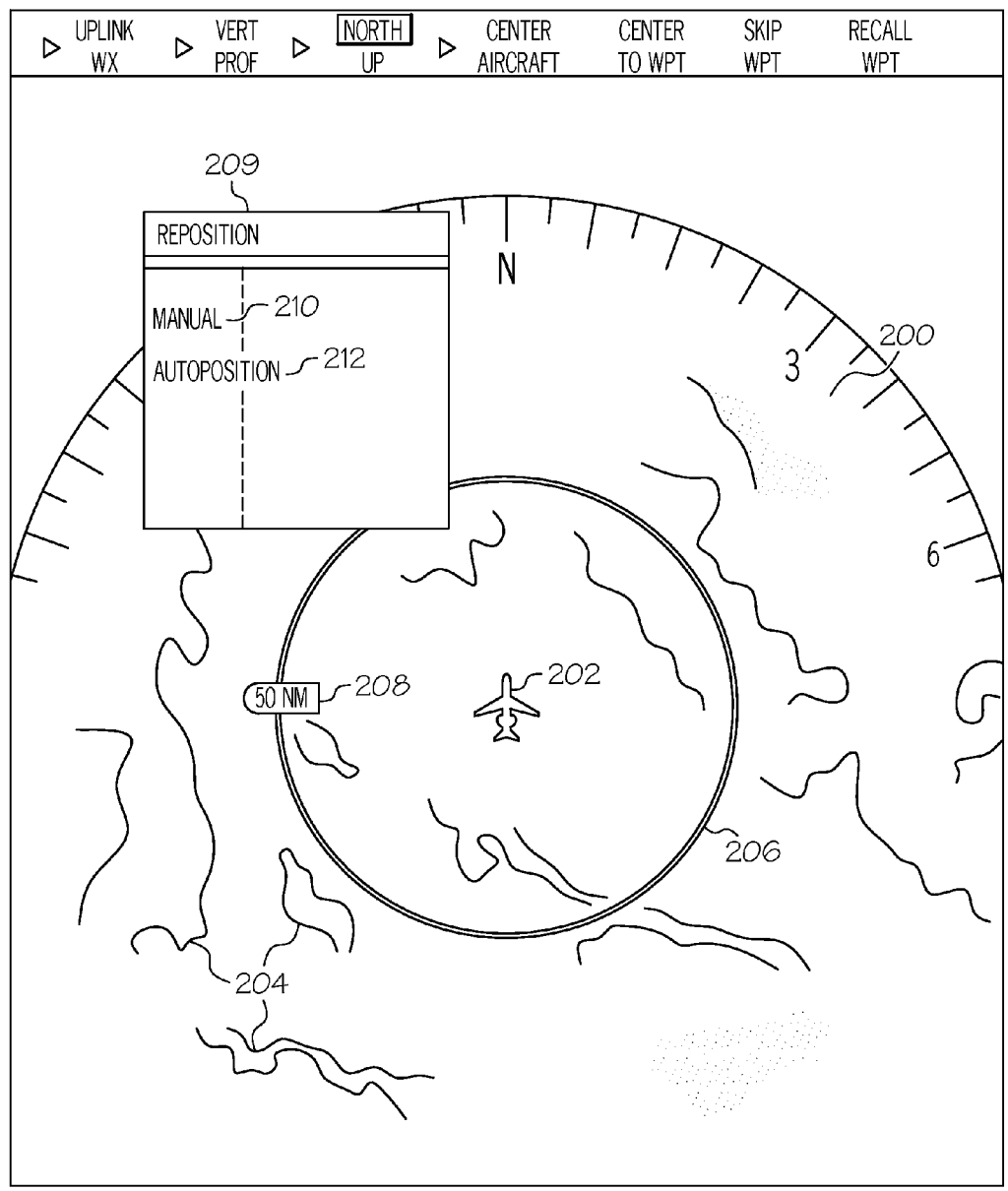
FIG. 2 is a lateral moving map display screen illustrating a host aircraft (also referred to herein as the ownship) and a dialog box or menu.

Referring to FIG. 2, and with continued reference to FIG. 1, a display process may be performed to enable a user, such as a pilot or other crew member, to quickly and easily adjust (or scroll) the displayed area (or field of view) of a lateral moving map display 200 along the flight path or route defined by a flight plan (or travel plan). In an exemplary embodiment, the display process initializes by displaying a vehicle, such as an aircraft, in a viewing area on a display device associated with the vehicle. For example, referring now to FIG. 2, and with continued reference to FIG. 1, the display process may display and/or render a navigational or moving map 200 associated with the current (or instantaneous) location of an aircraft 202 on a display device 102 in the aircraft. The aircraft 202 and/or terrain 204 are positioned and/or rendered within the navigational map 200 with respect to the center location in a manner that accurately reflects the real-world positioning of the aircraft 202 relative to the center location such that the navigational map 200 corresponds to a top-down view of the aircraft 202 (e.g., from a higher altitude than the aircraft 202 is currently flying). In this regard, the graphics module 114 may be configured to control the rendering of the navigational map 200 on the display device 102. The display process may also be configured to render a graphical representation of the aircraft 202 on the map 200. Although FIG. 2 depicts a top view (e.g., from above the aircraft 202) of the navigational map 200, in practice, alternative embodiments may utilize various perspective views, such as side views, three-dimensional views (e.g., a three-dimensional synthetic vision display), angular or skewed views, and the like.

As is well known, the display process may render and/or display a graphical representation of a portion of a flight plan overlying the background such that the portion of the flight plan within the geographic area corresponding to the currently displayed area of the navigational map 200 is presented on the display device. As described in greater detail below, the displayed area of the navigational map corresponds to the geographic area that is currently displayed in the navigational map 200; that is, the field of view about the center location of the navigational map 200. As used herein, the center location of the navigational map 200 comprises a reference location for the middle or geometric center of the navigational map 200 which corresponds to a geographic location.

In an exemplary embodiment, the map 200 is associated with the movement of the aircraft, and the background refreshes or updates as the aircraft travels, such that the graphical representation of the aircraft 202 is positioned over the background in a manner that accurately reflects the current (e.g., instantaneous or substantially real-time) real-world positioning of the aircraft 202 relative to the earth. As shown in FIG. 2, the map 200 may be initially centered on the aircraft 202 such that the center location of the navigational map 200 corresponds to the current location of the aircraft 202. In this regard, the center location of the navigational map 200 may be updated or refreshed such that it corresponds to the instantaneous location of the aircraft 202 as the aircraft travels, as will be appreciated in the art. In alternative embodiments, the center location of the navigational map 200 may correspond to a geographic location that is independent of the current location of the aircraft as is also well known.

The navigational map 200 is typically displayed with initial display settings. The display settings comprise one or more characteristics that control the manner in which the aircraft 202 and/or terrain 204 initially appear on the display device, such as, for example, an initial orientation, center location, and range setting. In the illustrated embodiment shown in FIG. 2, the orientation of the navigational map 200 is north-up (i.e., moving upward on the map 200 corresponds to traveling northward). Alternatively, the orientation of the navigational map 200 may be track-up or heading-up (i.e., aligned such that the aircraft 202 is always traveling in an upward direction and the background adjusted accordingly) or with another direction (e.g., east-up), and the subject matter described herein is not limited to any particular orientation of the navigational map 200. As set forth above, the center location of the navigational map 200 comprises a reference location for the middle or geometric center of the navigational map 200 which corresponds to a geographic location on the ground. The aircraft 202 and/or terrain 204 are positioned and/or rendered within the navigational map 200 with respect to the center location in a manner that accurately reflects the real-world positioning of the aircraft 202 and/or terrain 204 relative to the center location such that the navigational map 200 corresponds to a top-down view of the aircraft 202 (e.g., from a higher altitude than the aircraft is currently flying).

The display process 200 indicates the range setting for the navigational map 200 by displaying and/or rendering one or more range rings 206 on the navigational map 200. The range ring 206 comprises a circle that is always displayed with a fixed dimension and/or size on the navigational map 200 and indicates the range setting for the navigational map 200. The range setting is equal to the real-world distance that corresponds to (or is equivalent to) the radius of the range ring 206 based on the scale of the navigational map 200. As shown in FIG. 2, the range ring 206 indicates that the radius of the circle comprising the range ring 206 corresponds to a distance of fifty nautical miles as shown at 208.

As stated previously, a pilot may pan the lateral map display to show, for example, a maximum forward planned path. For example, if the route of a planned trajectory extends west-to-east, the pilot may orient the map with North up and then pan the map such that the aircraft symbology is at the far left of the display since the pilot is less concerned about features to the rear of the current position of the aircraft than features and waypoints that are ahead of the current location of the aircraft within the flight plan.

As also stated previously, user (e.g., a pilot and/or co-pilot) may manually adjust the area displayed in the lateral map display by scrolling the map in either a lateral direction (e.g., up or down, left or right) or a cardinal direction (e.g., North or South, East or West), or by manually dragging the map to a desired area. However, in some situations, adjusting the area displayed in the lateral map in the proper direction can be difficult and/or not intuitive; for example, when the lateral map is oriented in the direction of travel (e.g., heading up) or when the flight plan turns in a direction that is not evident by the current state of the lateral map display. In addition, it is difficult to adjust the lateral map display diagonally and/or in a non-cardinal direction. At times, the aircraft may even travel off the display without the pilot noticing, thus decreasing the pilot's situational awareness. In addition, repositioning the lateral map display undesirably increases the workload on the pilot.

Thus, the exemplary embodiments described herein provide a system and method for determining an optimized position on a display at which the ownship or host aircraft symbology should be generated and statically displaying the aircraft (i.e. "sticking" the aircraft) at that position. Also described in connection with a further exemplary embodiment are a system and method for dynamically determining an optimized position on a display at which the ownship or host aircraft symbology should be generated based on a projected flight plan and/or changes to that flight plan.

In a first exemplary embodiment, a "REPOSITION" task menu 209 (FIG. 2) may be provided that, when selected, allows the pilot to click on a desired function. For example, if a crew-member selects "MANUAL" 210, the crew-member may click on the geographically centered aircraft symbol, drag it to a desired location on the display, and attach it (i.e. stick it) to that location. That is, selecting an appropriate item on the task menu will permit the host aircraft symbol to be highlighted and dragged to any location on the display. This also commands the display to define the positions of other display objects relative to the new aircraft position. Thus, the navigation and display objects will appear at the correct positions relative to the host aircraft on the display.

Figure 3:
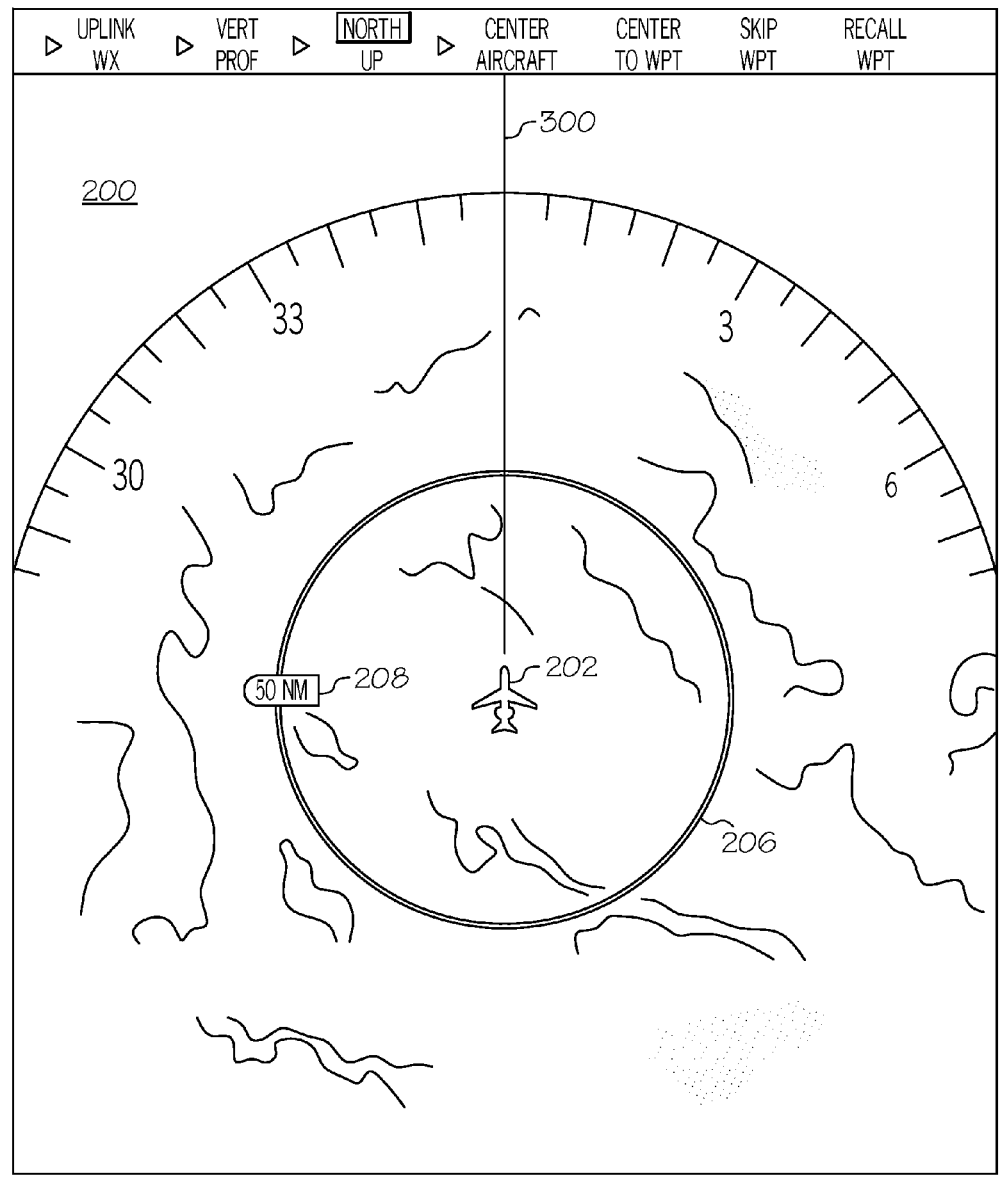
FIG. 3 illustrates a lateral moving map display screen in accordance with a first embodiment.
Figure 4:
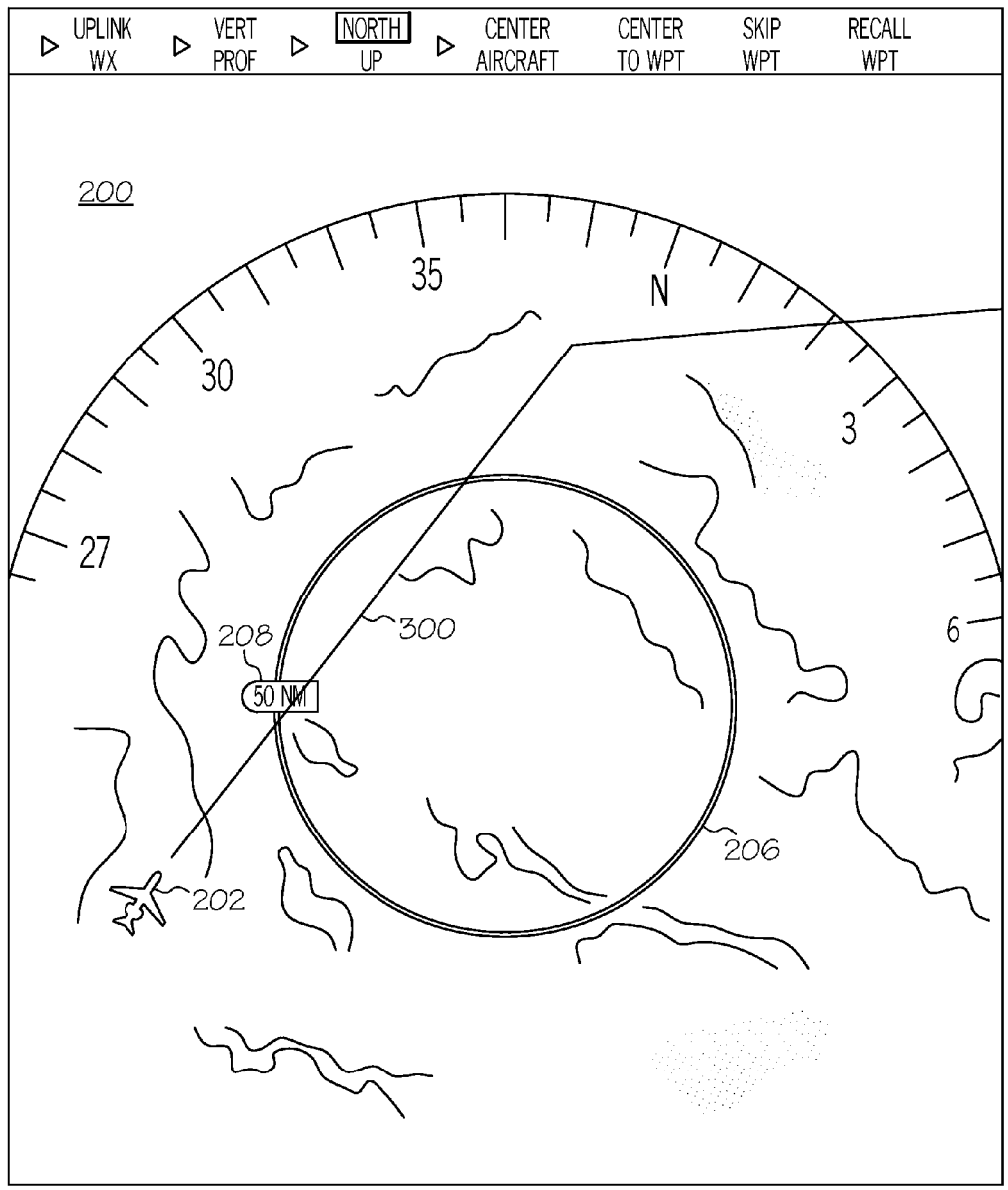
FIG. 4 illustrates a lateral moving map display screen in accordance with a first embodiment.
Figure 5:
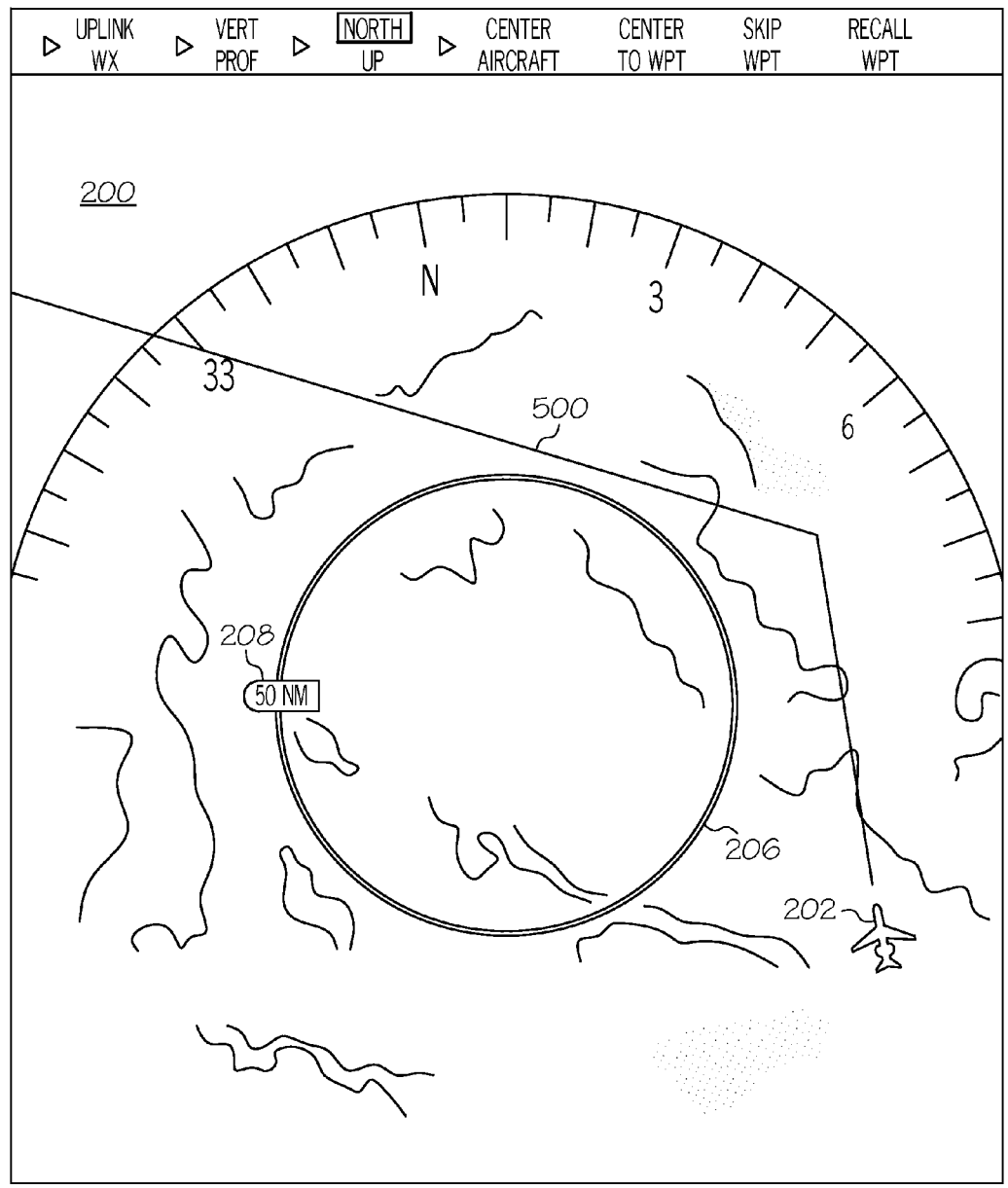
FIG. 5 illustrates a lateral moving map display screen showing a host aircraft at the center and a section of a fight plan.
Figure 6:
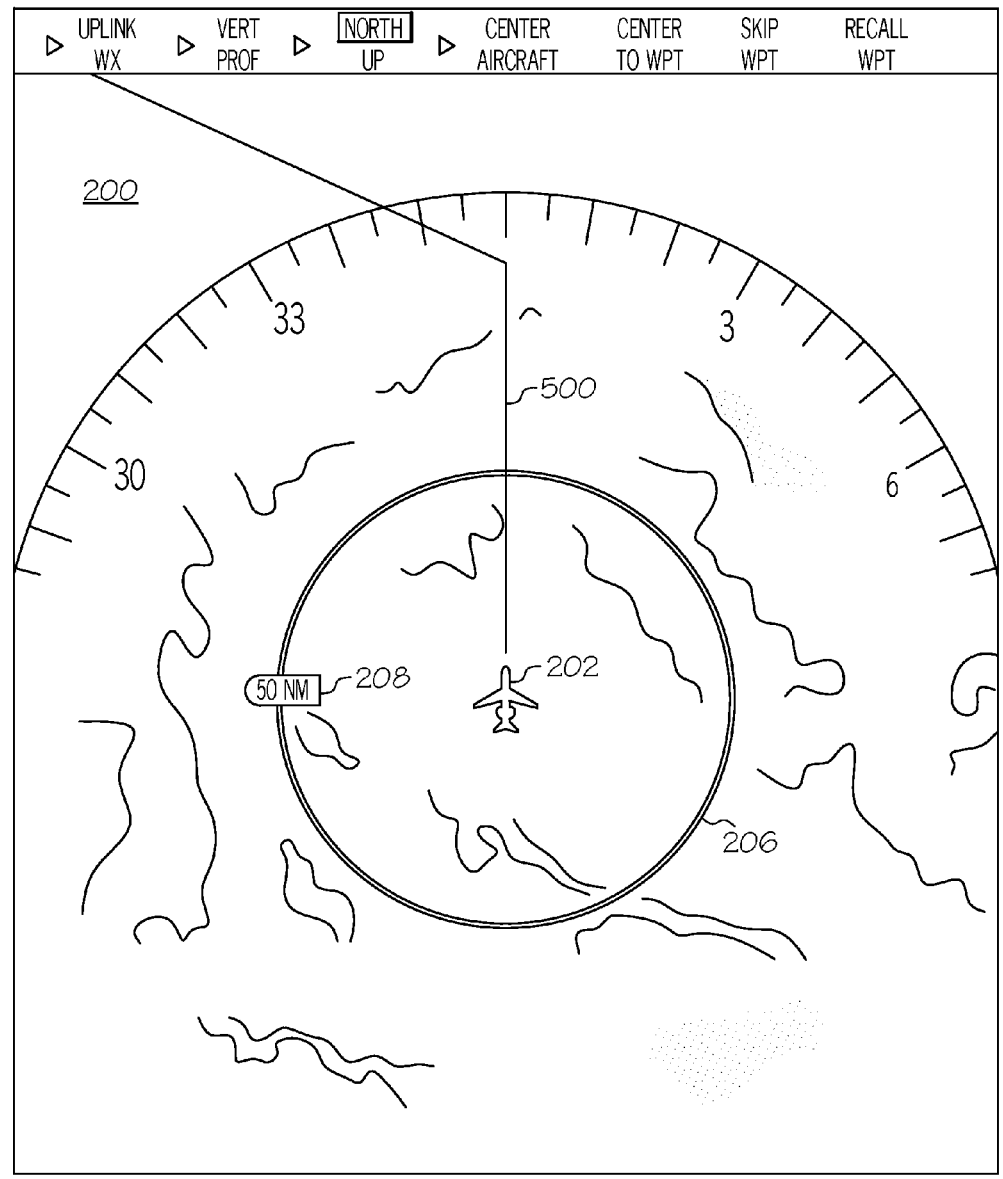
FIG. 6 illustrates a lateral moving map display screen in accordance with a second embodiment.
Figure 7:
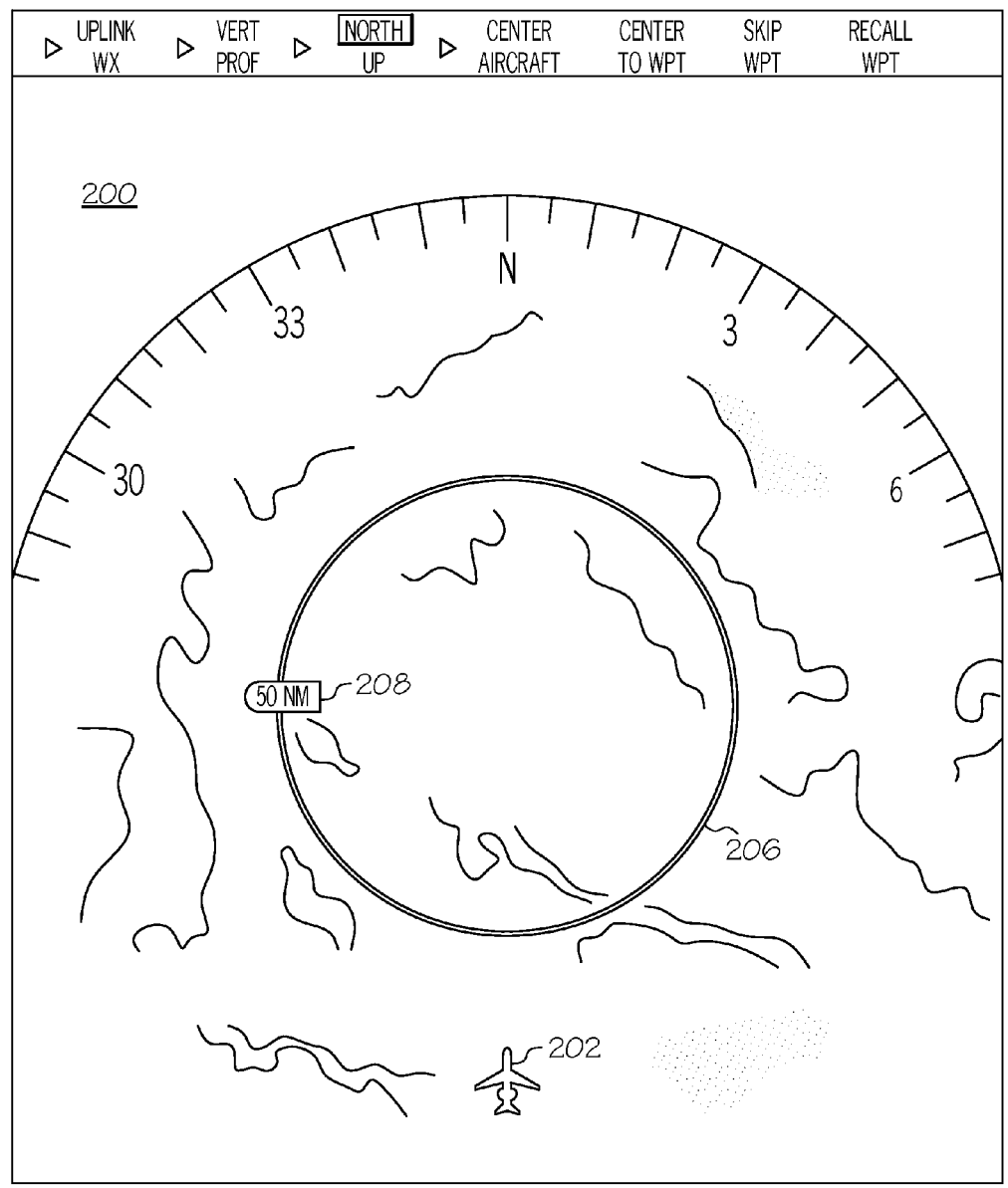
FIG. 7 illustrates a lateral moving map display screen in accordance with a third embodiment.
Figure 8:
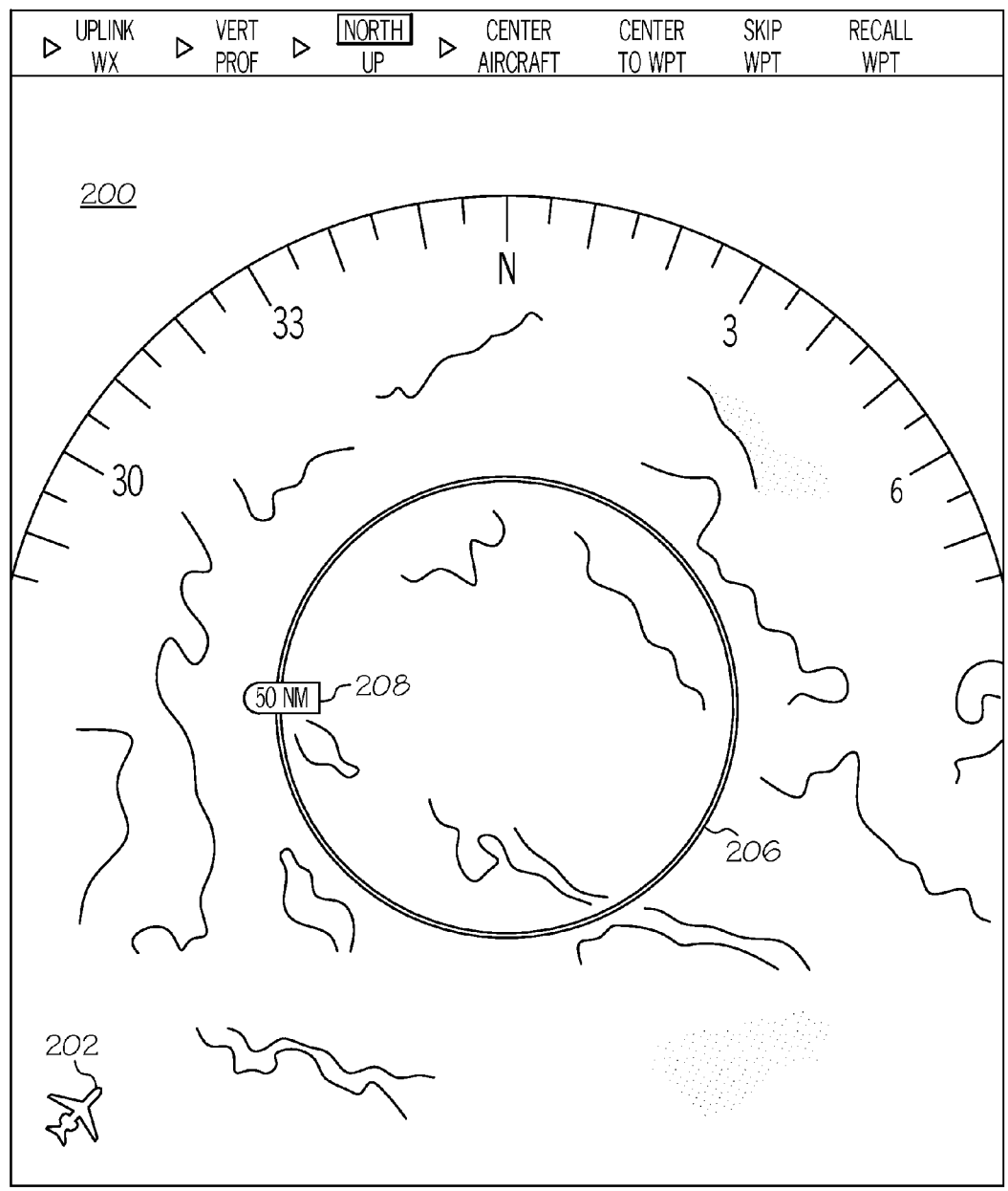
FIG. 8 illustrates a lateral moving map display screen in accordance with a fourth embodiment.

Alternatively, the crew-member may select "AUTOPOSITION" 212 or an icon representing this function. If there is a flight plan when this mode is selected, the aircraft symbol, under the control of processor 112 and graphic module 114, will relocate and stick the host aircraft symbology 202 at a location that optimizes the forward looking volume based on the current flight plan. For example, FIG. 3 graphically represents aircraft 202 having a flight plan 300. In FIG. 4, however, aircraft 202 has been repositioned on the display to increase the visualization of flight plan 300. Similarly, aircraft 202 in FIG. 5 has been repositioned on display 200 to increase the visualization of flight plan 500 beyond that which is shown in FIG. 6. In the absence of a flight plan, selecting "AUTOPOSITION" may maximize the forward looking volume based on heading. For example, in accordance with an embodiment, aircraft 202 shown in FIG. 7 has been positioned to maximize the northward looking volume, whereas in FIG. 8, a northwesterly view has been maximized.

In a further exemplary embodiment, processor 112 (and other components of the system shown and described in connection with FIG. 1) may include an algorithm configured to analyze the flight plan and its spatial relationship with respect to display 200 so as to compute the best location to "stick" aircraft 202 and to update this location as needed; for example, as a flight plan changes to a more southerly direction from an easterly direction, the aircraft 202 symbol would shift vertically up and to the right-hand side of display the 200.

Figure 9:
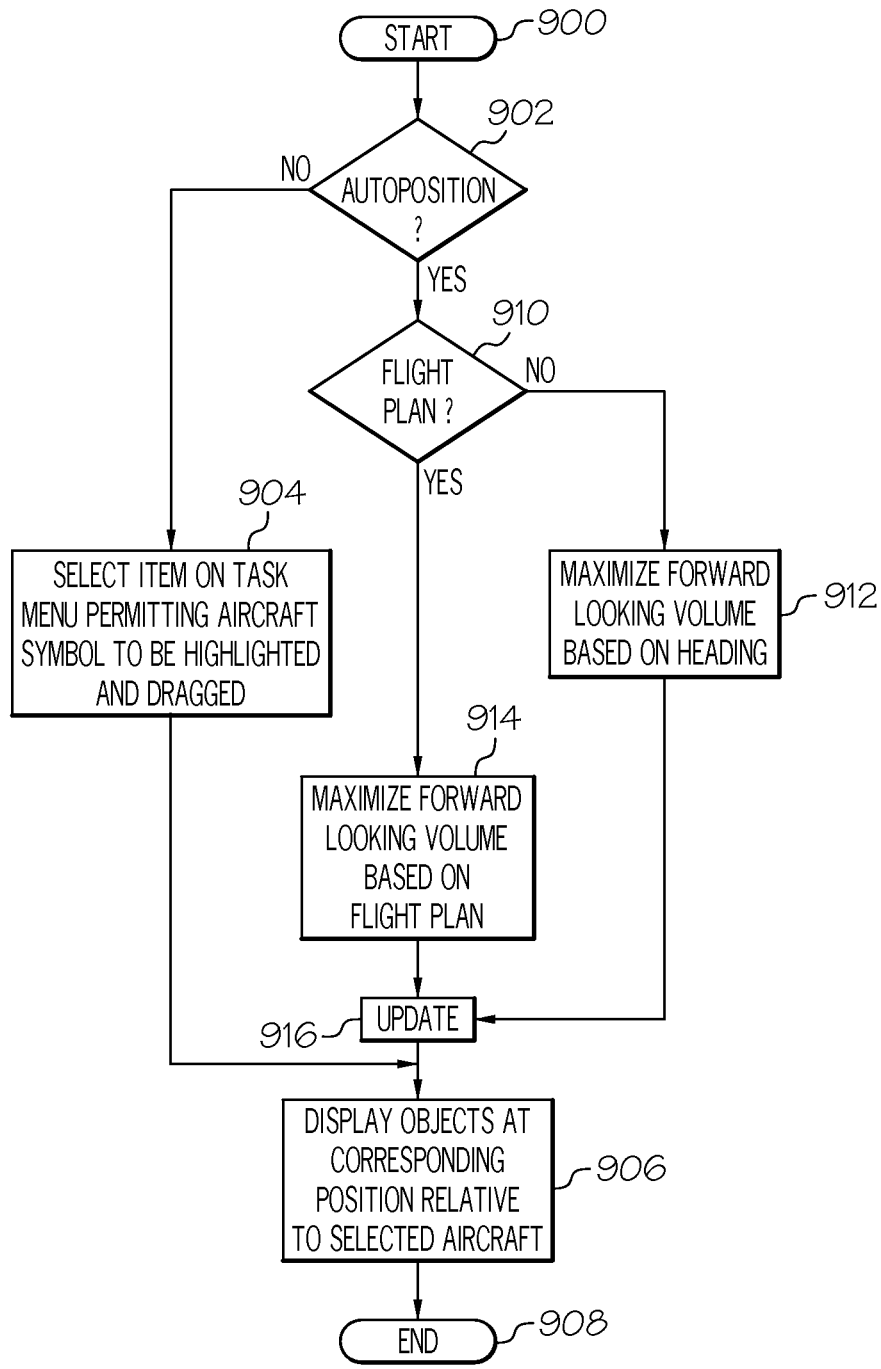
FIG. 9 is a flowchart illustrating an exemplary embodiment of a method for determining a preferred position on a display at which the ownship or host aircraft symbology should be rendered and secured to that position (i.e. "sticking" the aircraft to that position).

FIG. 9 is a flowchart illustrating an exemplary embodiment of a method 900 for determining a more suitable position on a display at which the ownship or host aircraft symbology should be generated and "sticking" the aircraft at that position. When the aircraft symbol is moved, the other navigation and display objects will appear at the correct positions relative to the aircraft on display. Beginning with STEP 902, a determination is made as to whether a request is being made to autoposition the host aircraft symbology based on heading or an existing flight plan. If not, the host aircraft may be grabbed by a cursor or similar mechanism, highlighted if desired, and dragged to a desired location on the display (STEP 904). Other display objects will be likewise be relocated so as to occupy corresponding positions relative to the selected aircraft (STEP 908).

If AUTOPOSITION is selected (STEP 902), but no flight plan exists (STEP 910), the host aircraft symbology is repositioned so as to improve or maximize the aircraft's forward looking volume on the display based on the aircrafts current heading as shown at STEP 912. Optionally, an updated position of the ownship symbology may be generated on the display symbology based on a change in heading (STEP 916). As was the case previously, other display objects will be likewise be relocated so as to occupy corresponding positions relative to the selected aircraft (STEP 906).

If a flight plan exists (STEP 910), host aircraft symbology is repositioned so as to improve or maximize the aircraft's forward looking volume on the display based on the aircraft's flight plan as shown at STEP 914. The position of the ownship symbology may be updated based on an analysis of the flight plan and a determination of the best location to stick the aircraft (STEP 916). Once again, other display objects will be likewise be relocated so as to occupy corresponding positions relative to the selected aircraft (STEP 908).

Thus, there has been provided a system and method for determining an optimized position on a display at which the ownship or host aircraft symbology should be generated and statically displaying the aircraft (i.e. "sticking" the aircraft) at that position. There has also been provided a system and method for dynamically determining an optimized position on a display at which the ownship or host aircraft symbology should be generated based on heading or a projected flight plan and/or changes to that flight plan. While the process has been described in connection with altering the position of the host aircraft, it should be understood that the described techniques are equally applicable for altering the location of other selected aircraft.

The foregoing exemplary embodiment was described above in the context of a fully functioning computer system (i.e., avionics display system 200 shown in FIG. 1); however, those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution. Furthermore, although described above in the context of an aircraft, embodiments of the method and system are equally applicable to vehicles in general While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A method for improving the view of an intended trajectory of a vehicle on a lateral map display comprising a top-down view of the vehicle, the method comprising:
   initially displaying an ownship symbol graphically representative of the vehicle on the lateral map display at a center of the lateral map display, wherein a center location of the lateral map display is updated to correspond to a location of the vehicle as the vehicle travels;
   when an item on a menu is selected, permitting manual altering of the position of the ownship symbol on the lateral map display to adjust an area displayed in the lateral map display by panning the lateral map display to increase the view of the intended trajectory on the lateral map display, wherein other symbology on the lateral map display is relocated to corresponding locations relative to the ownship symbol when the position of the ownship symbol is altered; and
   sticking the ownship symbol to the altered position on the lateral map display, wherein the lateral map display is updated relative to the ownship symbol statically displayed at the altered position as the vehicle travels.

2. The method of claim 1, the vehicle comprising an aircraft, wherein the step of altering comprises changing the position to increase a forward looking volume of airspace at a predetermined aircraft heading.

3. The method of claim 1, the vehicle comprising an aircraft, the method further comprising the step of updating the position of the ownship symbol on the lateral map display to increase visualization of the flight plan as the aircraft proceeds along the flight path.

4. The method of claim 1, the vehicle comprising an aircraft, the method further comprising altering the position of the ownship symbol to increase a forward looking volume of airspace as the aircraft changes heading.

5. The method of claim 1, wherein:
   the lateral map display is associated with movement of the vehicle and updates as the vehicle travels in a manner that reflects a current real-world positioning of the vehicle; and
   altering the position comprises relocating the ownship symbology on the lateral map display to pan the lateral map display to show a maximum forward planned path for the vehicle based on a current travel plan.

6. The method of claim 1, wherein altering the position comprises altering the position in response to a user manually adjusting the area displayed in the lateral map display.

7. The method of claim 1, wherein altering the position comprises altering the position in response to a user manually dragging the ownship symbol to a desired location on the lateral map display.

8. The method of claim 7, wherein altering the position comprises altering the position in response to the user manually dragging the ownship symbol when the item on the menu is selected to permit the ownship symbol to be highlighted and dragged.

9. The method of claim 1, wherein the altered position of the ownship symbol corresponds to a side of the lateral map display.

10. The method of claim 1, wherein altering the position comprises panning the lateral map display to show a maximum forward planned path.

11. The method of claim 1, wherein altering the position results in the center location of the lateral map display being independent of the location of the vehicle and being updated relative to the ownship symbol statically displayed at the altered position as the vehicle travels.

12. The method of claim 1, wherein the area displayed in the lateral map display is panned by scrolling the map in either a lateral direction or a cardinal direction.

13. An avionics system for optimizing the view of an intended trajectory of a first aircraft, comprising:
an avionics display system;
a first source of aircraft position data;
a second source of neighboring airspace and traffic data; and
a processor coupled to the display system, the first source, and the second source, and configured to initially display a symbol graphically representative of the first aircraft on a lateral map display at a center of the lateral map display and update a center location of the lateral map display to correspond to a location of the first aircraft as the first aircraft travels, permit manual altering of the position of the symbol on the lateral map display to pan the lateral map display and increase a view of the intended trajectory on the lateral map display when an item on a menu is selected, stick the symbol to the altered position, and relocate other symbology representative of the neighboring airspace and traffic data on the lateral map display at corresponding locations relative to the first aircraft when the position of the symbol is altered, wherein the lateral map display comprises a top-down view of the vehicle and is updated relative to the altered position as the first aircraft travels.

14. The system of claim 13 wherein the processor is further configured to increase a forward looking volume of airspace at a predetermined aircraft heading.

15. The system of claim 14 wherein the processor is further configured to increase a forward looking volume of airspace for a predetermined flight plan.

16. The avionics system of claim 13, wherein:
the lateral map display is associated with movement of the first aircraft and updates as the first aircraft travels in a manner that reflects a current real-world positioning of the first aircraft; and
altering the position comprises relocating the symbol on the lateral map display to pan the lateral map display to show a maximum forward planned trajectory for the first aircraft based on a current flight plan.

17. A method for optimizing the view of an intended trajectory of a first aircraft on a lateral map display comprising a top-down view of the first aircraft, the method comprising:
receiving initial position data of a first aircraft;
receiving data representative of airspace in the vicinity of the first aircraft;
initially displaying a symbol on the lateral map display graphically representative of the first aircraft at a center of the lateral map display, wherein a center location of the lateral map display corresponds to the initial position data and is updated to correspond to a location of the first aircraft as the first aircraft travels;
when an item on a menu is selected, permitting manual altering of the position of the symbol on the lateral map display to increase the view of the intended trajectory on the lateral map display by panning the lateral map display;
sticking the symbol to the altered position on the lateral map display; and
displaying other symbology on the lateral map display at corresponding locations relative to the first aircraft, wherein the other symbology is relocated on the lateral map display to corresponding locations relative to the ownship symbol when the position of the symbol is altered and the lateral map display is updated relative to the altered position as the first aircraft travels.

18. The method according to claim 17 wherein the processor is further configured to increase a forward looking volume of airspace as the aircraft changes heading.

* * * * *